(12) United States Patent
Vorenkamp et al.

(10) Patent No.: US 10,300,762 B2
(45) Date of Patent: May 28, 2019

(54) METHOD OF MAKING AN ACOUSTIC AUTOMOTIVE HVAC AND AIS DUCT WITH A PARTICLE FIBER SLURRY

(71) Applicant: Toledo Molding & Die, Inc., Toledo, OH (US)

(72) Inventors: Erich James Vorenkamp, Pinckney, MI (US); Charles David Satarino, Milan, MI (US); Karthik S. Jayakumar, Canton, MI (US); Christopher Paul Durand, Toledo, OH (US); Peter Ermie, Jr., Perrysburg, OH (US)

(73) Assignee: Toledo Molding & Die, Inc., Toledo, OH (US)

( * ) Notice: Subject to any disclaimer, the term of this patent is extended or adjusted under 35 U.S.C. 154(b) by 222 days.

(21) Appl. No.: 15/492,848

(22) Filed: Apr. 20, 2017

(65) Prior Publication Data

US 2017/0305232 A1    Oct. 26, 2017

Related U.S. Application Data

(60) Provisional application No. 62/324,934, filed on Apr. 20, 2016.

(51) Int. Cl.

| | |
|---|---|
| *B28B 1/26* | (2006.01) |
| *B28B 1/52* | (2006.01) |
| *B60H 1/00* | (2006.01) |
| *D21J 1/04* | (2006.01) |
| *D21J 3/04* | (2006.01) |
| *D21J 7/00* | (2006.01) |

(Continued)

(52) U.S. Cl.
CPC ...... *B60H 1/00564* (2013.01); *B29C 47/0054* (2013.01); *D21J 3/04* (2013.01); *D21J 7/00* (2013.01); *B28B 1/26* (2013.01); *B28B 1/52* (2013.01); *B29K 2105/06* (2013.01); *D21J 1/04* (2013.01)

(58) Field of Classification Search
CPC ............... B28B 1/26; B28B 1/52; D21J 1/04
USPC .................... 264/86, 87, 120, 122
See application file for complete search history.

(56) References Cited

U.S. PATENT DOCUMENTS 3,793,138 A * 2/1974 Rohrer .................. D21J 7/00
                                                162/219
4,609,519 A * 9/1986 Pichard ................ B29C 33/046
                                                264/510

(Continued)

FOREIGN PATENT DOCUMENTS

WO    WO2016004522    1/2016

*Primary Examiner* — Jason L Vaughan
(74) *Attorney, Agent, or Firm* — McHale & Slavin, P.A.

(57) ABSTRACT

Disclosed is a method to form arbitrarily shaped, uniform, lightweight, thermally insulating and acoustically absorptive automotive components with controllable density, thickness, porosity, and surface integrity. The method is based on natural cellulosic fibers such as those found in cardboard and paper and uses a thermoplastic fiber and particle slurry to form fusible components. The method produces components having the benefit of commercially available thermoformed fiber mats or open-cell extruded foam components with excellent acoustical properties, enhanced thermal insulation, and are light weight, which limits engine inefficiency, and the high cost of such products so as to allow large scale implementation.

17 Claims, 7 Drawing Sheets

(51) Int. Cl.
*B29K 105/06* (2006.01)
*B29C 47/00* (2006.01)

(56) References Cited

U.S. PATENT DOCUMENTS

| | | | | |
|---|---|---|---|---|
| 5,238,615 | A | * | 8/1993 | Stoor ............... B29C 45/14336 249/78 |
| 5,820,801 | A | * | 10/1998 | Greve .................... B29B 11/16 264/86 |
| 6,110,037 | A | | 8/2000 | Yoshinaka |
| 6,153,144 | A | * | 11/2000 | Byma ..................... B27N 3/02 264/113 |
| 6,228,478 | B1 | * | 5/2001 | Kliwer ................... B60R 13/08 264/122 |
| 6,409,590 | B1 | | 6/2002 | Suzuki et al. |
| 6,447,041 | B1 | | 9/2002 | Vandersluis et al. |
| 6,520,849 | B1 | | 2/2003 | Greenwald et al. |
| 6,547,931 | B1 | * | 4/2003 | Kumamoto .......... B65D 1/0207 162/219 |
| 2004/0011489 | A1 | * | 1/2004 | Kimbara .................. D21J 3/10 162/218 |
| 2004/0090088 | A1 | | 5/2004 | Reed et al. |
| 2005/0266789 | A1 | | 12/2005 | Hier et al. |
| 2006/0157538 | A1 | * | 7/2006 | Crasser ................. B23K 20/10 228/113 |
| 2008/0113193 | A1 | * | 5/2008 | Comino Almenara ... B28B 1/26 428/361 |
| 2011/0074184 | A1 | | 3/2011 | Hashikawa et al. |
| 2014/0000489 | A1 | * | 1/2014 | Ikeda .................... C04B 14/043 106/609 |

* cited by examiner

METHOD OF MAKING AN ACOUSTIC AUTOMOTIVE HVAC AND AIS DUCT WITH A PARTICLE FIBER SLURRY

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 62/324,934, filed Apr. 20, 2016, entitled "Method Of Making An Acoustic Automotive HVAC and AIS Duct with a Particle Fiber Slurry", the contents of which is incorporated herein by reference.

FIELD OF THE INVENTION

This application is related to the field of acoustic duct formation for vehicles.

BACKGROUND OF THE INVENTION

Current processes of producing fiberous ducts require sheet-forming of incoming feedstock, followed by fusing duct halves together, and trimming significant portions of the incoming stock off as un-recycled waste. Such techniques start with a certain thickness of incoming sheet-stock and effectively stretch the material into thinner sections during molding, which can severely limit both the shapes that can be formed and the uniformity of material distribution in the final product. Although surface profile corrugations can be formed into the parts for stiffening, it is generally not possible for these processes to incorporate ribs or thick sections since the forming process can only stretch and compress the material. Such products tend to be very flexible in nature, to the point of being floppy, which can require the addition of reinforcements, mounting tabs, and end-fittings so the products can be adequately assembled into a system. Thermoforming of this nature is generally regarded as a slow manufacturing process and is best suited for low-volume production.

The use of pulp-forming of cellulosic fiber packaging for consumer goods is well known. Thermoforming and matched-mold forming of either fibrous mat or extruded open-celled foam products is common practice for use with consumer goods. Blow molding of foamed polymers is becoming more prevalent, but the known technologies cannot currently produce sufficiently open-celled structures that are necessary to produce a truly acoustic duct used in an automobile. All known techniques suffer from sensitivity to stretch ratios, which makes wall thinning a challenge for deep draw areas.

Most applicable prior art is primarily defined by the potential for porosity and its importance for acoustic properties and, owing to the open structure of the material, increased thickness and improved thermal insulation. Such prior art primarily relates to matched-mold thermoforming of either partially or fully open-cell extruded foam sheets or nonwoven polymer fiber mat sheets. These techniques are limited in their capabilities in that a finite material must be stretched to match the contour of the mold wherein designs must be limited to restrict local stretch ratios and excessive thinning in deeply drawn areas. Another challenge with these techniques is that the material is generally utilized in rectangular blanks which, after forming, must be trimmed either before or after separate duct components are bonded together. In many cases, owing to the irregular nature of duct shapes, the inability to nest formed shapes into a mold layout limits part yield and results in a significant portion of the incoming material to be trimmed as scrap since the material is not directly recyclable back into the primary raw material stream and must be otherwise disposed of. Furthermore, the materials herein, being limited in thickness and stiffness, must frequently have expensive secondary applications of mounting tabs and duct ends for proper interfacing and assembly. All of the steps and waste inherent in the manufacture of such products, although while providing useful performance benefits, are too costly for broad market acceptance, thus they remain limited primarily to select premium vehicles; forcing lower cost vehicles to suffer with inefficient technologies.

WO2016/004522 A1 discloses a porous automotive HVAC duct composed of expanded polypropylene beads (EPP) which is formed in halves in a steam-chest process. However, EPP is not generally suitable for thin sections, such as for ducts, due to several shortcomings with the manner in which the material is fused only at their surfaces. While structures constructed from EPP are excellent in compression and generally applied as thick energy absorbers, they typically exhibit poor tensile and flexural properties. This material may serve well in permanent non-contact situations such as those behind instrument panels, but is less suited for floor ducts that may be exposed to high concentrated forces due to stepping loads, without considerable thickening or reinforcements. Thin EPP wall sections tend to break under conditions of tube-crush and component assembly forces. Molded EPP mounting tabs tend to be prone to breakage, and frequently must be made much thicker than is feasible for packaging, or must be added as injection, or otherwise molded, tabs in a secondary operation, further increasing system costs. Very thin wall sections, which are a frequent necessity in many tightly packaged situations, are ill-advised for EPP. Finally, expanded bead products, such as EPP and EPE, are specialty materials that cannot easily incorporate bio-materials or even recycled polymers.

What is lacking in the art is the use of cellulosic fiber technologies for the forming of automotive ducts and related items.

SUMMARY OF THE INVENTION

Disclosed is a method to form arbitrarily shaped, uniform, lightweight, bio-inhibiting, and acoustically absorptive and/or thermally insulating automotive components with controllable density, thickness, porosity, and surface integrity. Henceforth, the term porosity will be used as a general term to refer to a broad range of more specific acoustically relevant properties, such as void content, open surface area, exposed fiber surface area, tortuosity, air permeability, etc. The terms acoustically and thermally can generally be interchanged, as fibrous ducts that exhibit desirable acoustical properties also tend to exhibit desirable thermal insulation properties. Depending on the materials selected, this process can be used to produce a duct with only desirable acoustical properties or only desirable thermal insulation properties. For the purposes of this disclosure, the term acoustic can refer to a duct that is either both acoustically absorptive and thermally insulating, or either acoustically absorptive or thermally insulating. The method is an adaptation of pulp forming technologies based primarily on natural cellulosic fibers such as those found in cardboard and paper. In an effort to create the improved automobile HVAC and AIS (air induction system) ducting that OEM customers desire, the concept of adapting pulp technologies to use a thermoplastic fiber and optional particle slurry to form fusible components was envisaged. The goal was to produce components that have the benefits of commercially available thermoformed fiber mat or open-cell extruded foam components, such as excellent acoustical properties, enhanced thermal insulation, and light weight without the inherent waste, manufacturing challenges, inefficiency, and high cost of such products; which ultimately limits their large scale implementation.

An objective of the invention is to disclose a method of manufacturing that allows for arbitrary shapes with uniform walls that have no concern for draw or stretch ratios. The method allows for self-reinforced structures, such as with robust internal and external ribbing and tack-offs, an inherent capability, without wall thinning.

An objective of the invention is to disclose a net-shape acoustic duct manufacturing method that significantly reduces or eliminates in-process scrap.

Another objective of the invention is to provide a method to produce components of extremely uniform areal mass and thickness distribution, generally irrespective of part shape.

Another objective of the invention is to disclose a method of manufacturing that allows locally variable areal mass and thickness potential for integrally formed, thick, acoustic and thermal padding.

Another objective of the invention is to create a deposited wall structure that offers density and porosity gradients, with the potential for internal gaps, for more ideal acoustic properties.

Yet still another objective of the invention is to disclose a method that permits the potential for integrally formed semi-continuous to continuous skin.

Another objective of the invention is to disclose a method for use in forming a tough and resilient structure so as to maintain shape and support mounting features.

Still another objective of the invention is to disclose a method of manufacturing that allows a product to be formed from multiple synthetic materials, including polyethylene, polypropylene, thermoplastic elastomers (TPE), polyester, polyester copolymers, aliphatic or semi-aromatic polyamides, polyether ether ketone, polyeterimide, polyacrylonitrile, melamine, glass, carbon, or aramid, and/or natural materials, including as hemp, jute, flax, cellulose, and the like, and material blends thereof.

Another objective of the invention is to disclose a method of manufacturing that can be functionalized and tuned with locally or globally applied polymer beads or foam particles, expandable microspheres, particle damping additives, and the like.

Another objective of the invention is to disclose a method of manufacturing that allows the addition of components by over-molding in the slurry stage, fusing in the molding stage, or trapping in the bonding stage.

Still another objective of the invention is to disclose a method of manufacturing that allows inherent ability to incorporate recycled materials and bio-fibers into the product, eventually even becoming 100% recycled or bio-based.

Still another objective of the invention is to incorporate absorbent cellulosic fibers or polymer particles or fibers, such as polyacrylamide gel, into the wall structure to temporarily absorb and then to release through evaporation, condensed water that could cause damaging or annoying drips in an automotive HVAC system.

Another objective of the invention is to disclose a method of manufacturing that allows pulp-forming systems to create pre-forms very rapidly, either in-house or through external and regionally dispersed areas, allowing for distributed manufacturing operations to complete the assembly for improved flexibility.

Another objective of the invention is to disclose the in-mold lamination of surface scrims, films, or decorative coatings to offer reinforcement, porosity regulation, coloration, appearance, or surface chemistry modification, among other properties.

Another objective of the invention is to teach a method by which microwave, infrared, or radio frequency heating could be employed to provide the required heat for any step of drying, fusing, or bonding the components and the means by which susceptors could be incorporated into the mat composition to improve such heating methods.

Another objective of the invention is to teach a method of depositing a mat onto a porous, perforated, or otherwise acceptable, pre-formed material to serve as a carrier, binder, or to otherwise modify the properties of the composite.

Another objective of the invention is to teach the method of applying a solution to the composite, either pre- or post-forming, to apply liquid binders, adhesive particles, hydrocarbon absorbers, biocides, expandable microspheres, surface energy modifiers, etc., for either global or selective property enhancement.

Another objective of the invention is to teach a process by which reprocessed material, either un-fused fibers removed from preforms prior to fusing, or fused fiber bundles and clusters having been derived from previously fused or bonded components, shredded into acceptable form, and reintroduced into the pulp at an acceptable level to minimize waste.

An advantage of the invention is that high-strength organic or inorganic fibers, such as carbon, glass, or metallic fibers, can be included in the method for improved strength, stiffness, electrical conductivity, or other beneficial properties.

Still another advantage of the invention is that the method of manufacturing allows activated carbon particles or fibers or similarly functional zeolytes or other materials to be incorporated to impart hydrocarbon adsorption/desorption properties for AIS systems or smell abatement or biocide properties for HVAC ducting.

Yet another advantage of this invention is that the technology could be applied to other non or semi-structural properties, such as load floors, under body shielding, substrates for interior trim, such as for door liners, and the like.

Other objectives and advantages of this invention will become apparent from the following description taken in conjunction with any accompanying drawings wherein are set forth, by way of illustration and example, and certain embodiments of this invention. Any drawings contained herein constitute a part of this specification and include exemplary embodiments of the present invention and illustrate various objects and features thereof.

DETAILED DESCRIPTION OF THE INVENTION

Figure 1:
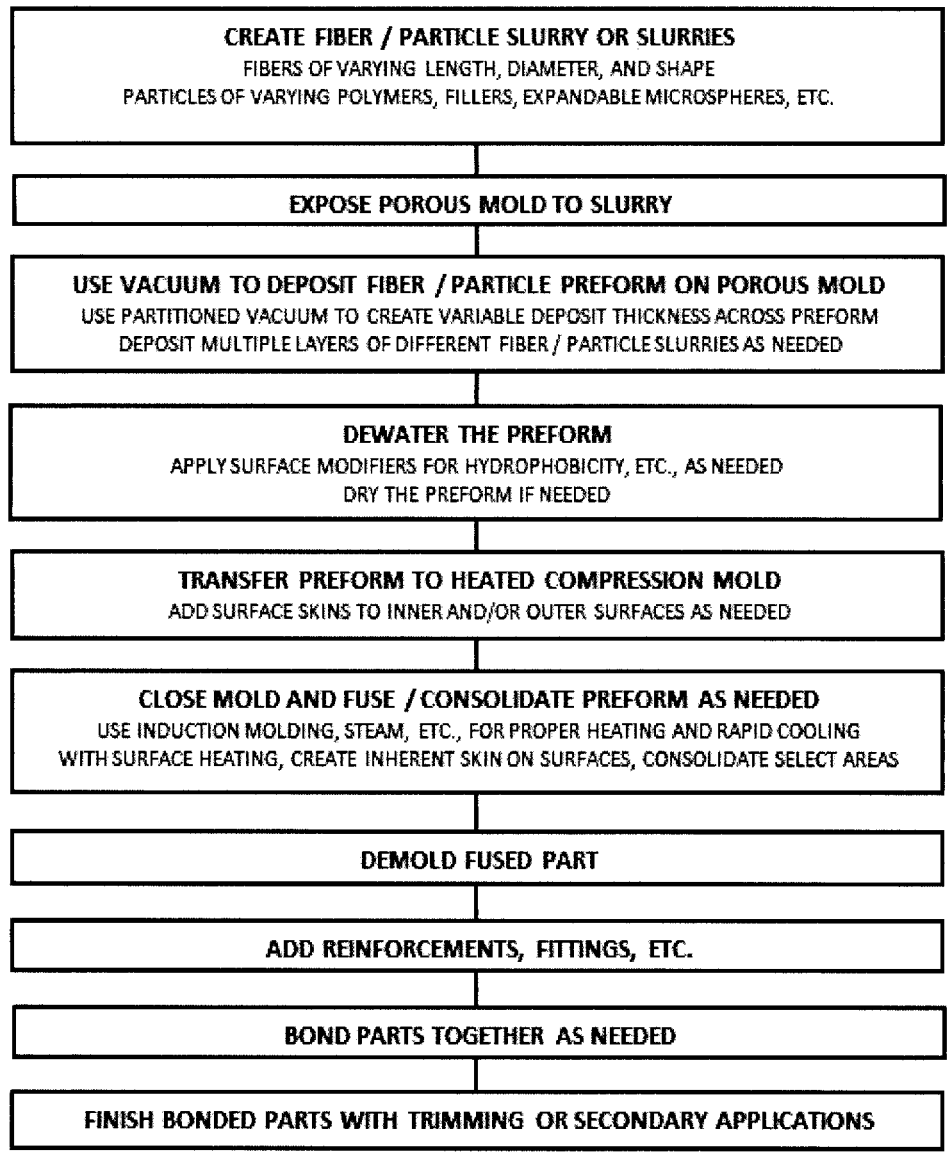
FIG. 1 is a flow chart of the method of operation.

A detailed description of the preferred embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representative basis for teaching one skilled in the art to employ the present invention in virtually any appropriately detailed structure.

The method disclosed herein replaces much, or all, of the natural fibers with synthetic polymer fibers and particles, which, for the pursuit of greatest current interest, focuses mostly, but not exclusively, on thermoplastics. Natural fibers and particles may also be incorporated to attain certain levels of performance. In the preferred embodiment, the fibers are between 2-38 mm in length, though it is possible to use fibers of other lengths, and in the range of 1-45 denier, though it is possible to use fibers of other diameters.

The first step in the process is to prepare the slurry. In this step, the fibers must be sufficiently opened, or separated. This can be done by using a hydropulper, which is a high shear mixing device commonly used in the pulp and paper industry to prepare slurries by both opening fibers, mixing fibers, and blending any process aids, such as dispersants, thickeners, and/or surfactants, into the slurry. The prepared slurry is then transferred to a vessel that will permit the slurry to be exposed to the porous mold.

Next, the slurry is accumulated onto the surface of a porous mold exposed to the fluidized slurry while under the action of vacuum. In this embodiment, vacuum is used to draw the slurry to the surface of the porous mold, through which the water from the slurry will pass while the solids present in the slurry will accumulate on the surface of the porous mold, thus forming the net-shape mat. It is possible to form the mat by pouring the slurry onto the surface of the porous mold while the mold faces a direction parallel to but opposite of the direction in which gravity acts. It is also possible to pump the slurry through the porous mold. The necessary action is to use the porous mold to filter solids from the slurry. To do this, a pressure difference must be created across the porous mold, with the pressure highest at the outside surface of the mold and decreasing through the mold. The method used to create the pressure difference is not of critical importance.

The porous mold can be machined from a block of metal, preferably aluminum in order to minimize weight, with holes to allow air and water to pass through, and covered on the side of the mold that is exposed to the slurry with a screen having an opening size sufficiently small enough to prevent the fibers and particles from passing through the mold. The screen material would preferably be stainless steel. However, the details of the porous mold are not critical; any mold design or material that sufficiently separates the solids in the slurry from the carrying fluid as the carrying fluid passes through the mold, and permits the use of partitioned vacuum, if desired for a particular process, can be used. After a prescribed time, the particles and fibers will form a substantially random mat on the porous areas of the mold; forming a nearly net-shape pre-form. The deposited material can be extremely uniform, regardless of shape, such as typically limits thermoformed and blow-molded components that are sensitive to stretch or blow ratios. Upon removal of the mold from the slurry, most of the carrying fluid is extracted and recycled into the system. The loose mat, in the shape of the component formed, is transferred to another mold where it is compression molded with sufficient heat to fuse the fibers and particles together to create a final component with excellent structural properties and the desired thickness, density, porosity, and surface integrity.

The fusing can be carried out though many mechanisms. In one embodiment, The heating process can melt all of the fibers in the preform together to create the structure. Alternatively, bi-component fibers, which are fibers made of two different materials, typically a lower melting temperature material on the outside of the fiber that surrounds a higher melting temperature fiber, can be incorporated into the preform. To fuse the duct, the material on the outside of the bi-component fiber can melt and either bond to other bi-component fibers or flow around and mechanically bond via encapsulation of the other fibers in the matrix. The choice of the appropriate mechanism depends on the desired properties of the duct product, raw material economics, etc.

The fusing of the duct need not be carried out with a compression molding process. It is possible to fuse the duct by applying heat and pressure using heated air that either flows through of past the surface of the preform. In such an embodiment, the transfer step in the process could be eliminated, and the fusing could be carried out on the porous mold by, for example, exposing the porous mold, with the preform still on the mold, to heated air, and then drawing the air through the porous mold, thereby drawing heated air through the preform and fusing the fibers of the duct. This type of fusing process would not be possible when using a purely cellulose slurry; the cellulose fibers do not permit air to flow through the preform with a sufficient volumetric flow rate to make this method of fusing economical in mass production.

The heated compression molding process may also enable thin inner and outer surface skins, such as films, woven, or nonwoven fabrics to be applied. Additionally, resin infusion or local application of fabric or solid reinforcements may also be applied. It is envisaged that, if the desired product is a hollow member, two halves of a final part would be produced with suitable joining features to enable the two halves to be welded, glued, or otherwise joined together. Because the components are produced in a substantially net-shape form, there is very little waste in the process.

The current invention improves upon the prior art above by enabling the ability to selectively form an open structured, porous component by depositing layers of fibers and, potentially, particles on the porous surface of a mold. This method can create a very uniform thickness of deposited material regardless of part shape, and, depending upon the duration and intensity of the vacuum draw in local areas of a mold, regions of dramatically increased thickness can be created to serve as thick acoustic absorbers, thermal padding, etc. The ability to deposit successive layers with different properties by exposing the porous mold to different slurries enables the formation of stratified structures for dramatic improvements in acoustics, structural integrity, and thermal insulation, and to help promote bonding of mating shells. The deposition process can also be used to selectively incorporate expandable polymer microspheres into the wall, which can be used to both increase the thickness and regulate the porosity and surface integrity of the material during the heating process. Prior to molding, or after, as desired, sprayed-on or dipped chemical treatments can be selectively added for mold prevention, hydrophobicity, flame retardency, coloration, hydrocarbon adsorption, etc. The fibers employed may be all of one type or material, or a blend of different structural, binder, and/or bi-component fibers or particles of varying sizes, shapes, and orientations.

The molding process, which fuses the fibers together at contact points, can be used to both consolidate and expand the structure to the desired wall thickness, density, and porosity. Incorporation of shaped cross section, hollow or fibrillated micro/nano fibers or other lightweight particles, such as intercalated graphite or organosilicate clays, into the slurry can provide tortuosity for both viscous and particle damping to further improve acoustic and thermal properties. The 3D network of bonded fibers throughout the structure, including fibers oriented, to some degree, in all directions, creates a very tough, resilient structure that can better sustain crushing forces with limited damage, rebounding to the original shape with relative ease. Built-in mounting tabs and mounting flanges will be similarly tough and resilient. Formed wall thicknesses can vary from less than 1 mm to over 20 mm, depending upon the degree of consolidation and expansion imposed in the molding process.

It is known in the industry that the application of an acoustical absorber, such as an adhesive backed open-cell foam pad, on the outside bend of the inner surface portion of a duct is frequently beneficial for reducing flow noise. Application of similar external pads is frequently used to improve thermal insulation or to provide a countermeasure to condensation accumulation and dripping, as well as to improve acoustical performance and reduce buzz, squeak, and rattle noises. In forming technologies such as blow molding, where access to deep interior bends may not be available, application of absorbent material may be difficult to accomplish. In open shell techniques, such as with injection molding, EPP molding, and thermoforming, access to bends in interiors of ducts is easily available, and application of adhesive-backed acoustic foam is possible before bonding the shells together to complete the duct. Such approaches add cost and are difficult to verify once a part is closed and bonded, making quality more of a challenge. The method of manufacture provides an ability to vary local thicknesses by either depositing a locally thicker layer of material or by selectively molding the area to be thicker and more porous. The capability to build-in sound-absorbing or thermal insulation features is also inherent using this method of manufacturing. This reduces the cost, complexity, and risk of using secondary operations for such features.

It is possible to further reduce assembly risk by over-molding components directly in the pulping system. Properly designed items, such as end fittings with suitable open-structured, perforated, or porous items, can be placed into the mold before exposure to the slurry. While accumulating the fiber deposit on the surface of the mold, fibers and particles can work their way into the pores and passages in the over-molded part, thus encapsulating it. During the molding/fusing step, the molded-in component can be fused into a permanent addition to the structure. This may be an ideal method to add naturally porous items such as foam seals, pads, and other items to the structure without the need for adhesives. Adding additional components during the fusing process is also an inherent and obvious possibility as well.

Heating the surfaces can impose a degree of surface melt that can create a locally formed, smooth, integral polymer film to further regulate local porosities for acoustic tuning, regulation of adhesive absorption, anti-drip, etc. Furthermore, the application of expandable microspheres with various expansion and degradation temperatures not only promotes expansion of the composite within the mold cavity and separation of fibers (lofting), it also presses fibers to the mold surface for proper surface integrity, increases the compressive and flexural properties of the structure, and, finally, can be used to further regulate porosity. Once the expandable microspheres expand to fill the cavity, they can be heated to their degradation temperature, wherein some of the microspheres will collapse, leaving a more open final structure. Polymer beads, expandable microspheres, and foam particles can be selected such that, at programmed temperatures, some will melt and collapse to leave behind voids and, upon solidification, may serve as a binder resin to further strengthen the composite. The formed shells can be produced with variable degrees of consolidation to promote effective bonding of adjacent shells or additional components.

Due to the nature of the method, since both inside and outside surfaces are molded in the primary embodiment, the inside surfaces are exceptionally smooth, thus promoting efficient air flow with both low pressure drops and reduced likelihood of flow-induced noise, which are both important performance criteria for HVAC ducting. Smooth walled AIS ducting is beneficial due to the nature of high speed airflow causing undesirable pressure losses in the presence of rough surfaces. An alternative to the primary embodiment is the ability of slurry to be pumped within the inner cavity of a hollow, porous mold, and thus deposit a suitable layer of material to form a wall. This can create a hollow component in a single step, with no secondary bonding operation required. This option would be heated and fused in a closed mold, but would result in a more rough interior surface since that surface doesn't contact a mold during fusing. This option may be employed for complex shapes where air flow velocities are lower and less prone to experience frictional losses or flow induced noise. In some instances a flexible member, such as an inflatable membrane or tube, may be used to press against the inner surface to both consolidate and smooth the inner surface during the heated forming stage.

Referring to Figures, set forth is a method of producing a net-shaped acoustic duct from a fiber slurry of the instant invention. FIG. 1 depicts the method of manufacturing a product from a fiber/particle slurry. The steps comprise the creation of a fiber/particle slurry or slurries. An example of a slurry composition consists of the following:

Particles 0-5%; fibers 0.01-5%; adhesion promoters 0-2%; dispersion aids 0-1%; thickeners 0-1%; and surfactants 0-1%; with the balance of the slurry being comprised of a carrying fluid.

Particles are selected from the group of: Polymer particles, beads, and flakes, expandable microspheres, polymer foam particles, organosilicate clays, expandable or non-expandable graphite flakes, mica, metal flake, graphene, carbon fiber or nanotubes, and the like.

Fine fibers are selected from the group of: Fibrillated or nano-fibrillated polyolefins, polyesters, polyamides, polyacrylonitrile, or bio-fibers such as any cellulose bearing plant fiber, cotton, or the like.

Chopped fibers are selected from the group of: thermoplastics, including polyethylene, polypropylene, thermoplastic elastomers (TPE), polyester, polyester copolymers, aliphatic or semi-aromatic polyamides, polyether ether ketone, polyeterimide, polyacrylonitrile, and/or non-thermoplastics, such as melamine, glass, carbon, or aramid, and/or natural materials, including as hemp, jute, flax, cellulose, and the like. Such fibers may be multi-component to incorporate several distinct properties, as well as supplied in profile shapes ranging from round, polygonal, multi-lobed, flat, or hollow, and in potentially different diameters and lengths.

Carrying fluids are selected from the group of: Water and primarily aqueous solutions of water, metal salts, PH modifiers, and various additives listed herein.

Adhesion promoters are selected from the group of: Organofunctional silanes, maleated monomers or polymers or other similar compatibalizing modifiers.

Dispersion aids are selected from the group of: 1,2-propanediol, 1,3-propanediol, 1,4-butanediol, 1,2-butanediol and 1,3-butanediol, among others.

Thickeners are selected from the group of: polypropylene glycols or oxides having high molecular weights, or high molecular weight polyacrylamides.

Surfactants are selected from the group of: Primarily cationic surfactants, such as cetyl trimethyl ammonium bromide or stearyl dimethyl benzyl ammonium chloride.

Figure 2:
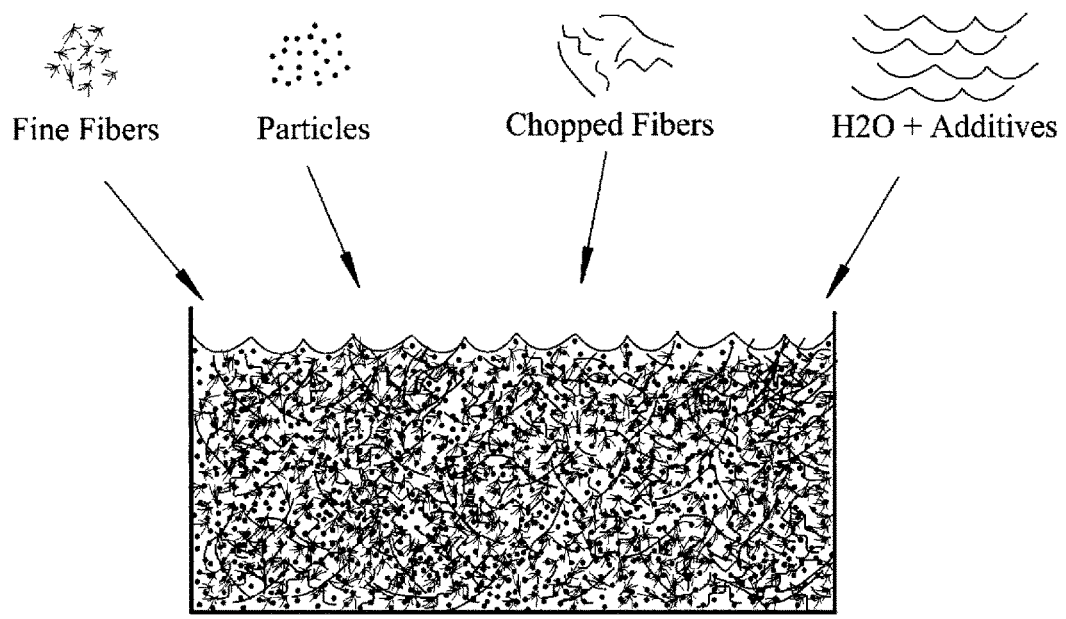
FIG. 2 is an illustration of the slurry.

FIG. 2 illustrates the use of a suitable slurry 10 using mostly conventional pulp forming systems and practices to create the slurry 10 from a composition comprising fine fibers 12, particles 14, chopped fibers 16 and additives 18.

Figure 3:
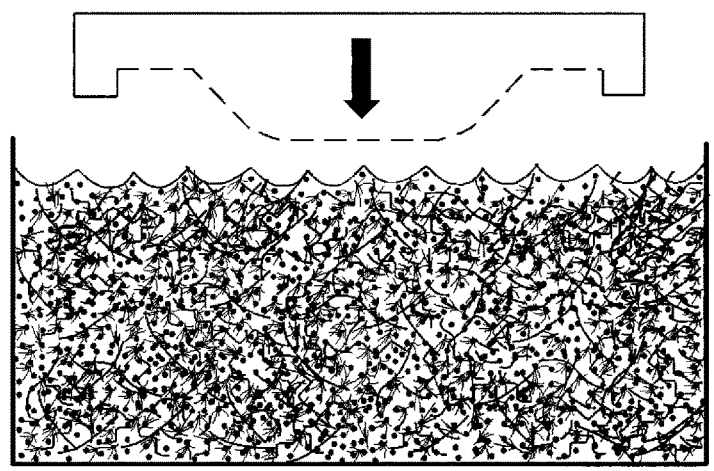
FIG. 3 is an illustration of the porous mold exposed to the slurry.
Figure 4:
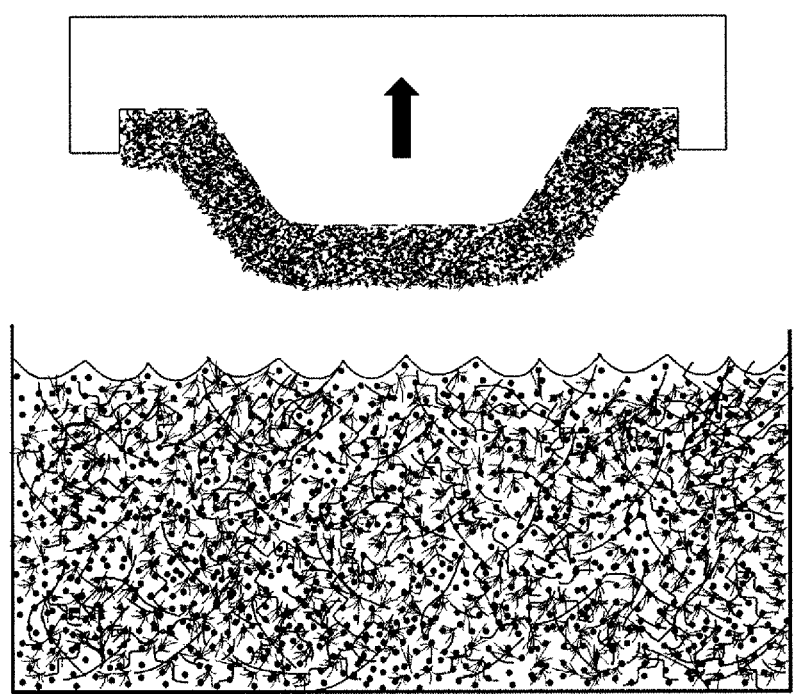
FIG. 4 is an illustration of the porous mold being withdrawn.

FIG. 3 depicts how the slurry 10 can be placed in a dip 20 or other otherwise expose a porous mold 22 to the slurry 10. Using vacuum to draw the carrier liquid through the porous surface of the mold, the particles and fibers are drawn to accumulate a suitable layer onto only the porous areas of the mold 22, FIG. 4. This establishes a net-shape potential mat 25 of the process. In the preferred embodiment, the deposited mat is dewatered by vacuum extraction as the mat 25 is transferred to a heated forming mold. However, it is possible to dewater the mat by orienting the porous mold such that the mat, while potentially still on the porous mold, drains with the assistance of gravity or externally applied pressure instead of using vacuum extraction.

The degree of dewatering needed will depend upon the composition and specific process needs and may not need to be complete. In some cases, substantial dewatering may not be desired nor needed at all.

Figure 5:
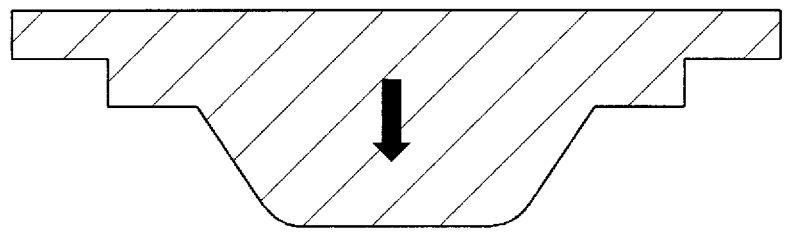
FIG. 5 is an illustration of a mat deposited into the heated mold.
Figure 5:
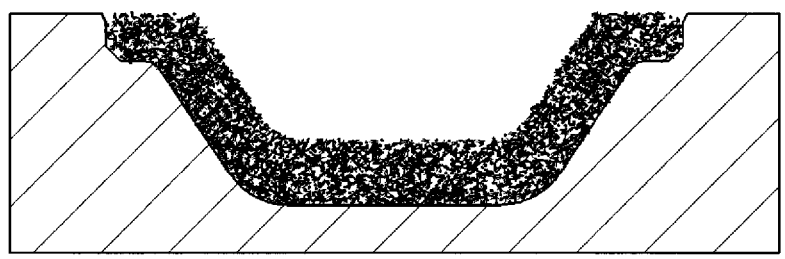
Figure 6:
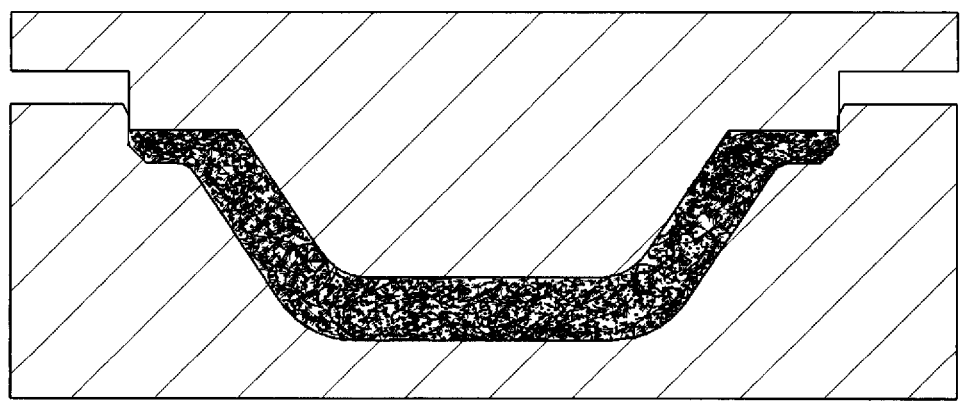
FIG. 6 is an illustration of the mold being closed.

Referring to FIGS. 5 and 6, the mat 25 is transferred into a heated mold having a base 30 and top 32 and closed to compress and fuse the fibers and particles into a semi-continuous article. Additional films or scrims can be added to the mold surfaces, if desired, to further regulate the article's surface properties, which will be fused to the article during molding. The mold 30 and 32 are closed on the mat and held for a period of time suitable to fuse the structure, optionally melting the surfaces to create a semi-continuous integral film for both porosity control and structural integrity. Different areas of the mold can be of different temperatures, and the mold system can incorporate aspects of a rapid-heat/rapid-cool style for improved cycle times or for imparting specific structural features such as selective surface filming.

Figure 7:
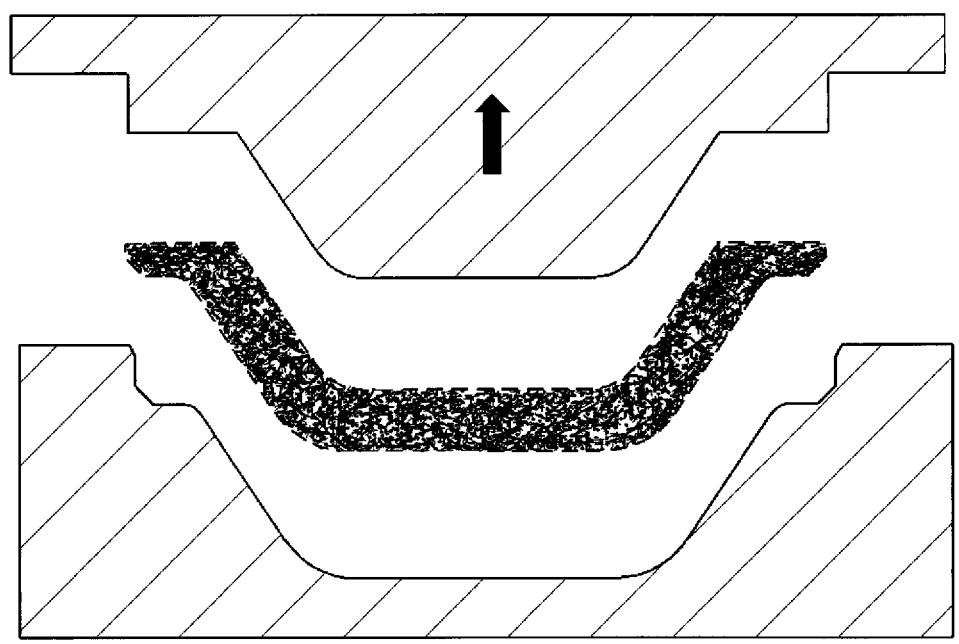
FIG. 7 is an illustration of the mold being opened for release of the part.

FIG. 7 depicts the fused mat which is now a shell 25' and is removed from the mold 30 and 32. The shell 25' is ready for final trimming, if needed, and assembly.

Figure 8:
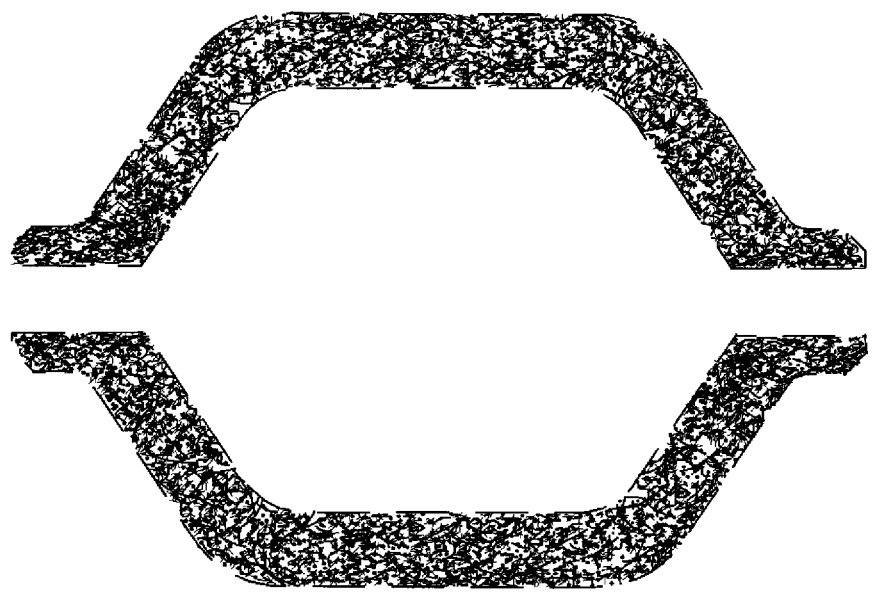
FIG. 8 is an illustration of a two shell article.
Figure 9:
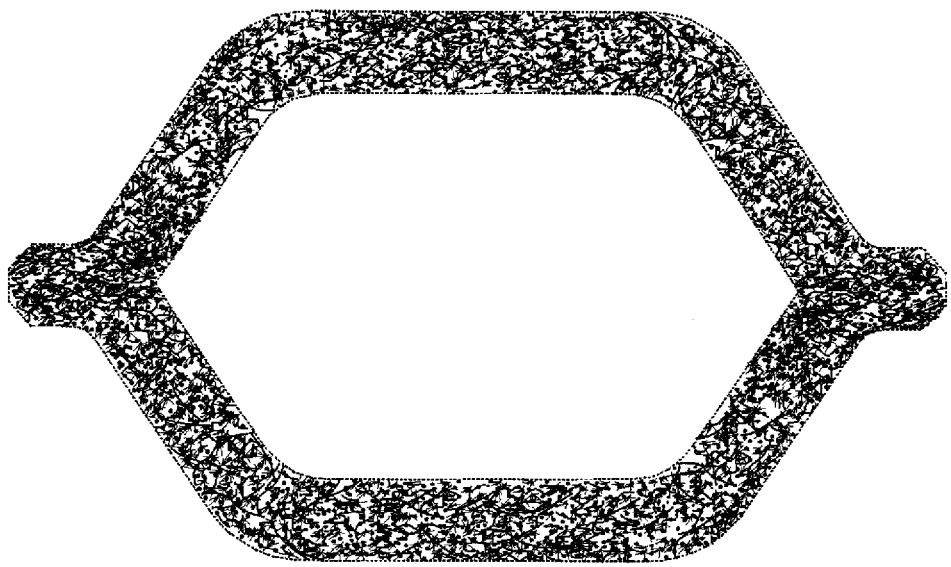
FIG. 9 is an illustration of the attached shell articles.

FIGS. 8 and 9 depicts different shell articles 25' and 25", designed to form a hollow duct 40 being positioned in a welding or bonding fixture. Internal supports, end adapters, etc., can be inserted into the hollow cavity at this time. Secondary treatments can be added at this time as well. The different shell articles 25' and 25" are welded or bonded together to form a hollow duct.

Figure 10:
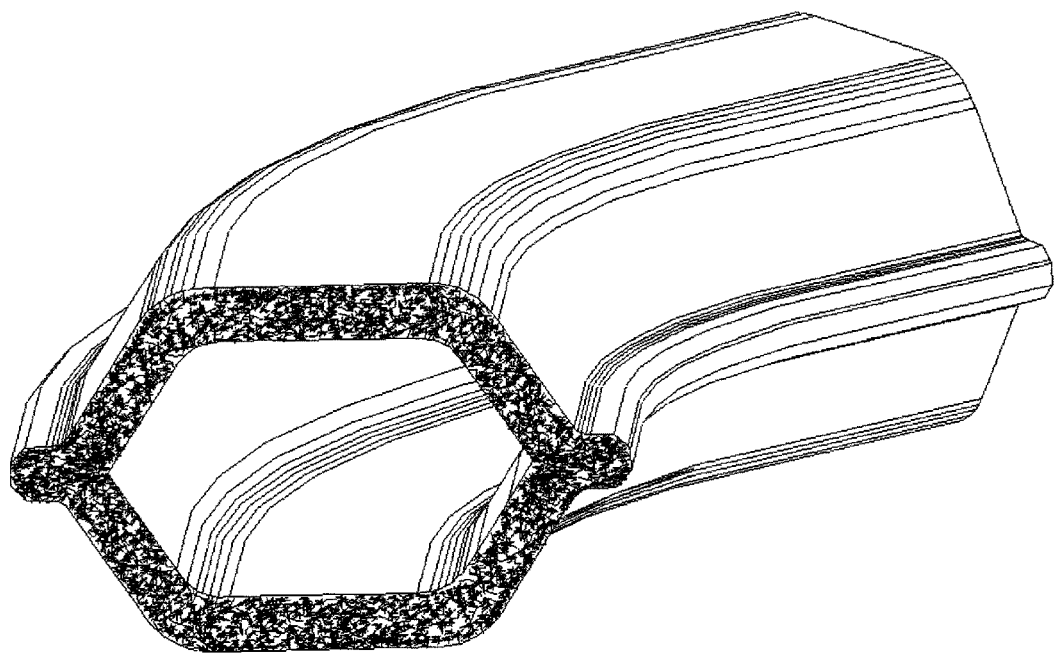
FIG. 10 is an illustration of an air duct formed from the articles.

FIG. 10—The final component is arbitrarily shaped with extremely uniform walls, integral surface skins, and regulated surface and overall porosity. Owing to the bonded network of fibers throughout, the article can be quite structurally sound, yet flexible and resilient.

The overall method of manufacture produces lightweight, selectively porous components with the potential for programmable thickness and density in an essentially net-shape manner, thus providing engineering benefits that meet or exceed those of the competing prior art, but with very little in-process waste and improved overall cost. Recycled polymer fibers are quite suitable for this technology, improving sustainability and further decreasing system costs. Additionally, this method is adaptable for the incorporation of bio-based, renewable fibers to supplant some of the polymer fibers as needed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention. Although the invention has been described in connection with specific preferred embodiments, it should be understood that the invention should not be unduly limited to such specific embodiments.

What is claimed is:

1. A method of manufacturing an acoustically absorptive automotive duct comprising:
   creating a slurry comprising a selection of fibers and water;
   exposing a porous mold to said slurry and depositing the fibers of said slurry on said porous mold to form a preform;
   using a partitioned vacuum to create variable deposit thickness across the preform;
   dewatering said preform;
   applying heat and pressure to said preform in order to activate any specific binding agent(s) employed within said preform to form a duct; and
   demolding the fused component, wherein the component is substantially structurally stable, with a controlled density, thickness, porosity, and surface integrity, and the component is acoustically absorptive in nature compared to solid structures of similar shape.

2. The method of making an acoustically absorptive automotive duct according to claim 1 in which the deposition of the fibers onto the porous mold can be carried out either by drawing the slurry through the porous molds using a vacuum source, or by pumping the slurry through the mold by applied pressure, or by draining the slurry through the mold using the force of gravity.

3. The method of making an acoustically absorptive automotive duct according to claim 1 in which the application of heat and pressure to the preform can be carried out by either compressing the preform with a heated compression mold, and/or by flowing heated air through the preform, and/or by flowing heated air past the inside or outside of the preform.

4. The method of making an acoustically absorptive automotive duct according to claim 3 including the step in which the preform is transferred from the porous mold to the apparatus that applies the heat and/or cooling according to claim 3.

5. The method of making an acoustically absorptive automotive duct according to claim 1 in which the slurry is also composed of one or more of the following: fibers of varying composition, diameter, profile, shape, and length, particles of varying polymers, fillers, including regrind of the process scrap, expandable microspheres, and dispersants, thickeners, surfactants, and other process aids.

6. The method of making an acoustically absorptive automotive duct according to claim 1 including the step of exposing the preform to said slurry multiple times in order to form a duct composed of multiple layers of the same composition and of controlled thickness.

7. The method of making an acoustically absorptive automotive duct according to claim 1 including the step of exposing the preform to various slurries one or more times in order to form a duct composed of multiple layers of various compositions.

8. The method of making an acoustically absorptive automotive duct according to claim 1 including the step of applying a surface modifier for hydrophobicity after dewatering said preform.

9. The method of making an acoustically absorptive automotive duct according to claim 1 including the step of using heat to thermally bond the constituent fibers at contact points to create an interconnected fiber network.

10. The method of making an acoustically absorptive automotive duct according to claim 1 including the step of adding steam or using induction molding to form an inner surface skin to said preform.

11. The method of making an acoustically absorptive automotive duct to claim 1 including the step of adding steam or using induction molding to form an outer surface skin to said preform.

12. The method of making an acoustically absorptive automotive duct according to claim 1 including the step of bonding ducts together by use of plastic welding.

13. The method of making an acoustically absorptive automotive duct according to claim 1 including the step of bonding ducts together remelting material around the perimeter of the ducts and applying pressure to compress the melted edges of the duct together in order to create a complete duct assembly.

14. The method of making an acoustically absorptive automotive duct to claim 1 including the step of applying rapid heat and/or cooling to the mold and/or preform to reduce the time required to manufacture the duct or to impart specific local properties.

15. The method of making an acoustically absorptive automotive duct to claim 1 wherein the step of forming a duct includes the step of binding the fibers of the duct together through the use of a binder fiber which is blended into the slurry.

16. The method of making an acoustically absorptive automotive duct to claim 1 wherein the step of forming a duct includes the step of binding the fibers of the duct together by spraying an adhesive onto the perform.

17. The method of making an acoustically absorptive automotive duct to claim 1 wherein the step of forming a duct includes the step of melting the fibers.

* * * * *